US012746522B2

(12) United States Patent
Ferary, IV

(10) Patent No.: US 12,746,522 B2
(45) Date of Patent: Sep. 29, 2026

(54) INLINE SOLIDS CONDITIONER AND PRE-WETTER

(71) Applicant: Joseph Baptiste Ferary, IV, Marietta, GA (US)

(72) Inventor: Joseph Baptiste Ferary, IV, Marietta, GA (US)

( * ) Notice: Subject to any disclaimer, the term of this patent is extended or adjusted under 35 U.S.C. 154(b) by 1010 days.

(21) Appl. No.: 17/973,496

(22) Filed: Oct. 25, 2022

(65) Prior Publication Data

US 2023/0130972 A1 Apr. 27, 2023

Related U.S. Application Data

(60) Provisional application No. 63/271,685, filed on Oct. 25, 2021.

(51) Int. Cl.
*B01F 35/10* (2022.01)
*B01F 23/50* (2022.01)

(52) U.S. Cl.
CPC .......... *B01F 35/145* (2022.01); *B01F 23/565* (2022.01)

(58) Field of Classification Search
CPC ...... B01F 23/54; B01F 23/565; B01F 25/314; B01F 25/434; B01F 35/52; B01F 35/145; B01F 2025/913
See application file for complete search history.

(56) References Cited

U.S. PATENT DOCUMENTS

| | | | | |
|---|---|---|---|---|
| 3,969,314 | A * | 7/1976 | Grigull | B29B 7/60 524/451 |
| 5,053,202 | A | 10/1991 | Dwyer et al. | |
| 5,634,715 | A * | 6/1997 | Stehr | B01F 33/25 366/159.1 |
| 6,523,991 | B1 * | 2/2003 | Maklad | B01F 25/31242 137/890 |
| 12,285,712 | B2 * | 4/2025 | Eggler | B01D 47/024 |
| 2003/0165078 | A1 | 9/2003 | Aggarwal | |
| 2004/0008571 | A1 | 1/2004 | Coody et al. | |

* cited by examiner

*Primary Examiner* — Elizabeth Insler

(57) ABSTRACT

A tube-in-tube inline solids conditioner and pre-wetter. The conditioner has three concentric tubes. A first ingredient is fed into an inner tube. A second ingredient is fed into an outer tube. The middle tube has a flared nozzle to form a tear drop flow with the second ingredient that surrounds the first ingredient. A vacuum chamber is formed between the middle tube and the inner tube. The cocoon and the vacuum prevent the formation of condensation inside the conditioner. The conditioner combines the two ingredients into a mixture that is pumpable.

20 Claims, 8 Drawing Sheets

INLINE SOLIDS CONDITIONER AND PRE-WETTER

FIELD OF THE INVENTION

The present invention relates generally to static mixers. The present invention relates more specifically to pre-wetters.

BACKGROUND OF THE INVENTION

A static mixer is a mixer with no moving parts. The liquids and/or solids are mixed as they flow around the geometry inside the mixer.

It is an objective of the present invention to provide inline, continuous blending of solids and liquids in a single pass through the present invention. It is an objective of the present invention to make the solid pumpable. It is an objective of the present invention to prevent the formation of condensation inside the mixer. It is an objective of the present invention to prevent build-up of solid ingredients inside the mixer. It is an objective of the present invention to prevent heat transfer between layers of the mixer.

SUMMARY OF THE INVENTION

An inline static mixer assembly including a tube-in-tube configuration for conditioning and/or pre-wetting solids for discharge into a pump or a tank. The conditioner has three concentric tubes. A solid or liquid is fed into an inner tube. A liquid is fed into an outer tube. The middle tube has a flared nozzle to form a cocoon with the liquid from the outer tube that surrounds the inner solid or liquid. A vacuum chamber is formed between the middle tube and the inner tube. The cocoon and the vacuum prevent the formation of condensation inside the mixer, preventing solid ingredients from forming a build-up inside the mixer. The mixer combines the two ingredients into a mixture that is pumpable.

DETAILED DESCRIPTION OF THE INVENTION

All illustrations of the drawings are for the purpose of describing selected versions of the present invention and are not intended to limit the scope of the present invention.

The present invention comprises an inline solids conditioner and pre-wetter. The conditioner has a tube-in-tube design. The conditioner is installed inline prior to a device with pumping capability. The conditioner pre-wets the solid ingredients before the ingredients are fed into a pump. The pre-wetting allows the mixture to be pumpable and to be mixed in a single pass.

Figure 1:
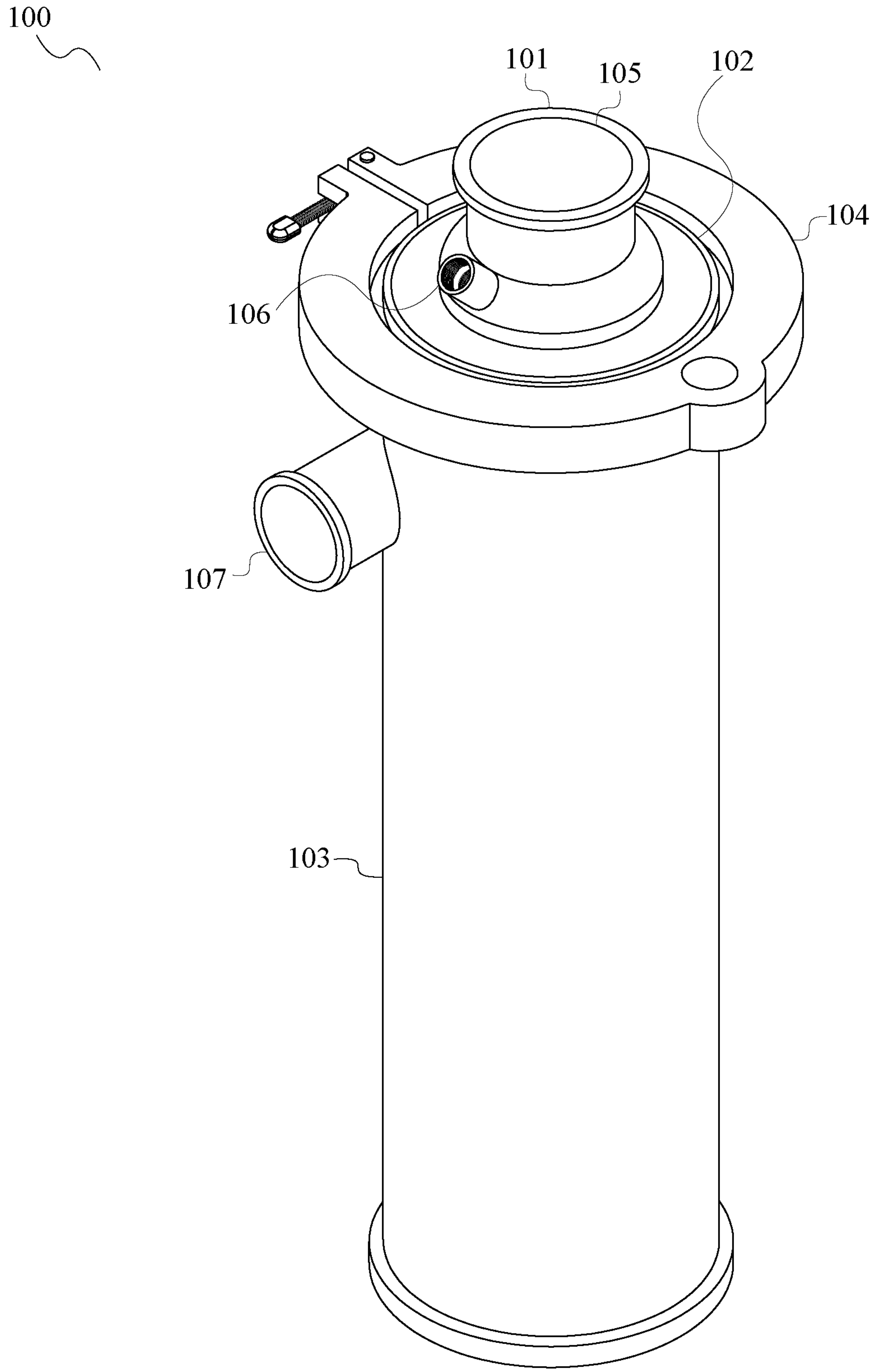
FIG. 1 is a perspective view of the present invention.
Figure 2:
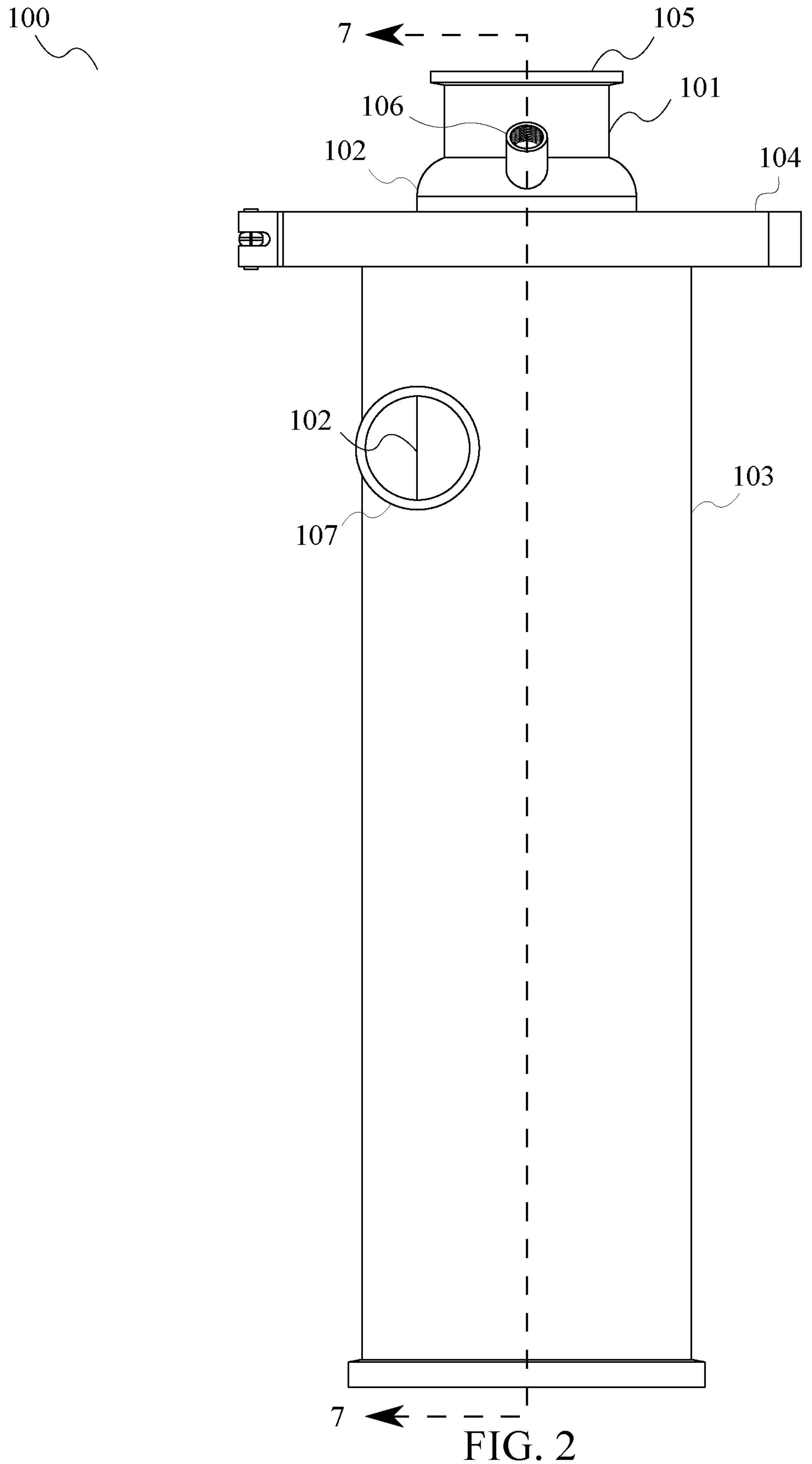
FIG. 2 is front view of the present invention.
Figure 3:
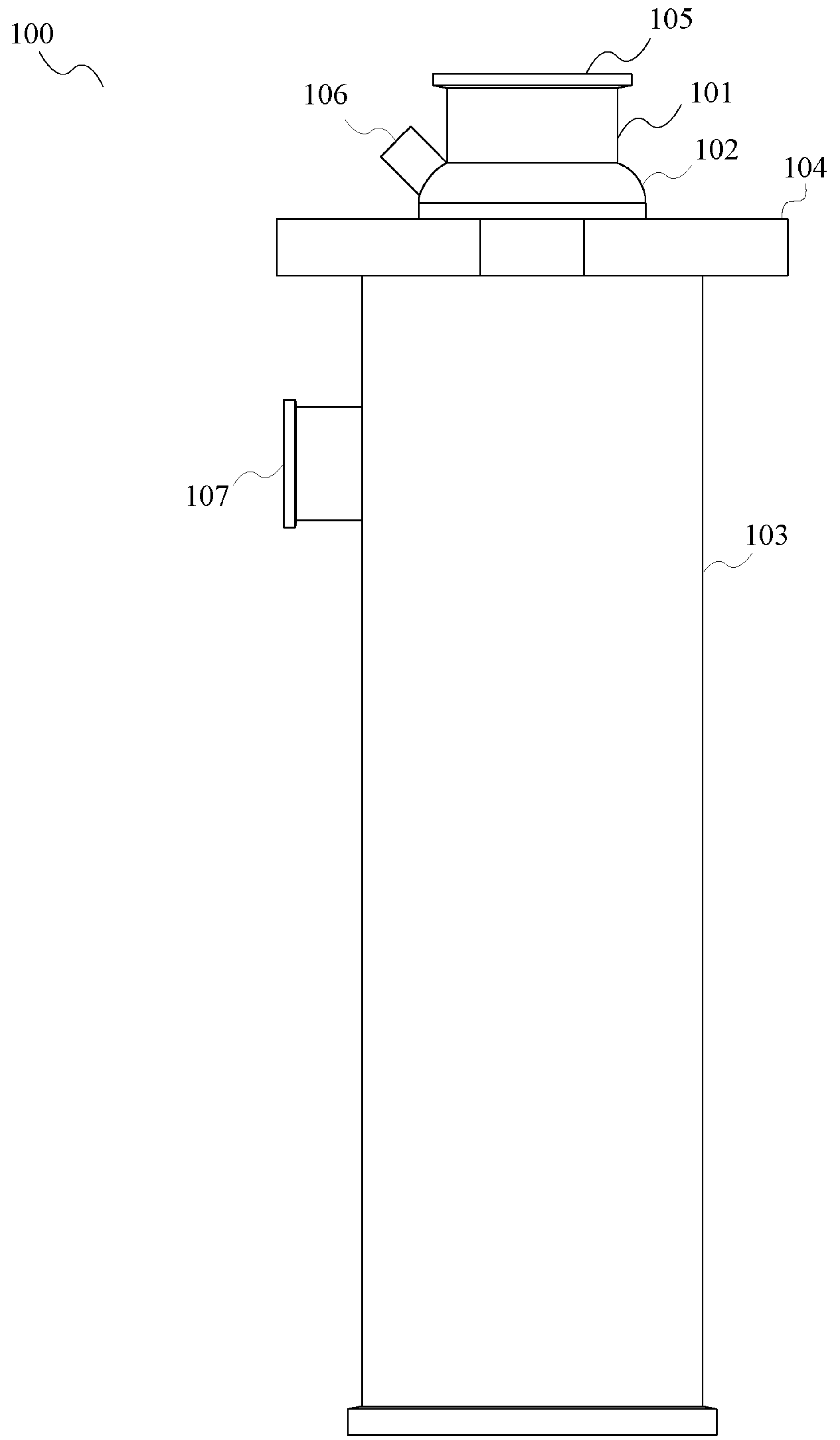
FIG. 3 is a right-side view of the present invention.
Figure 4:
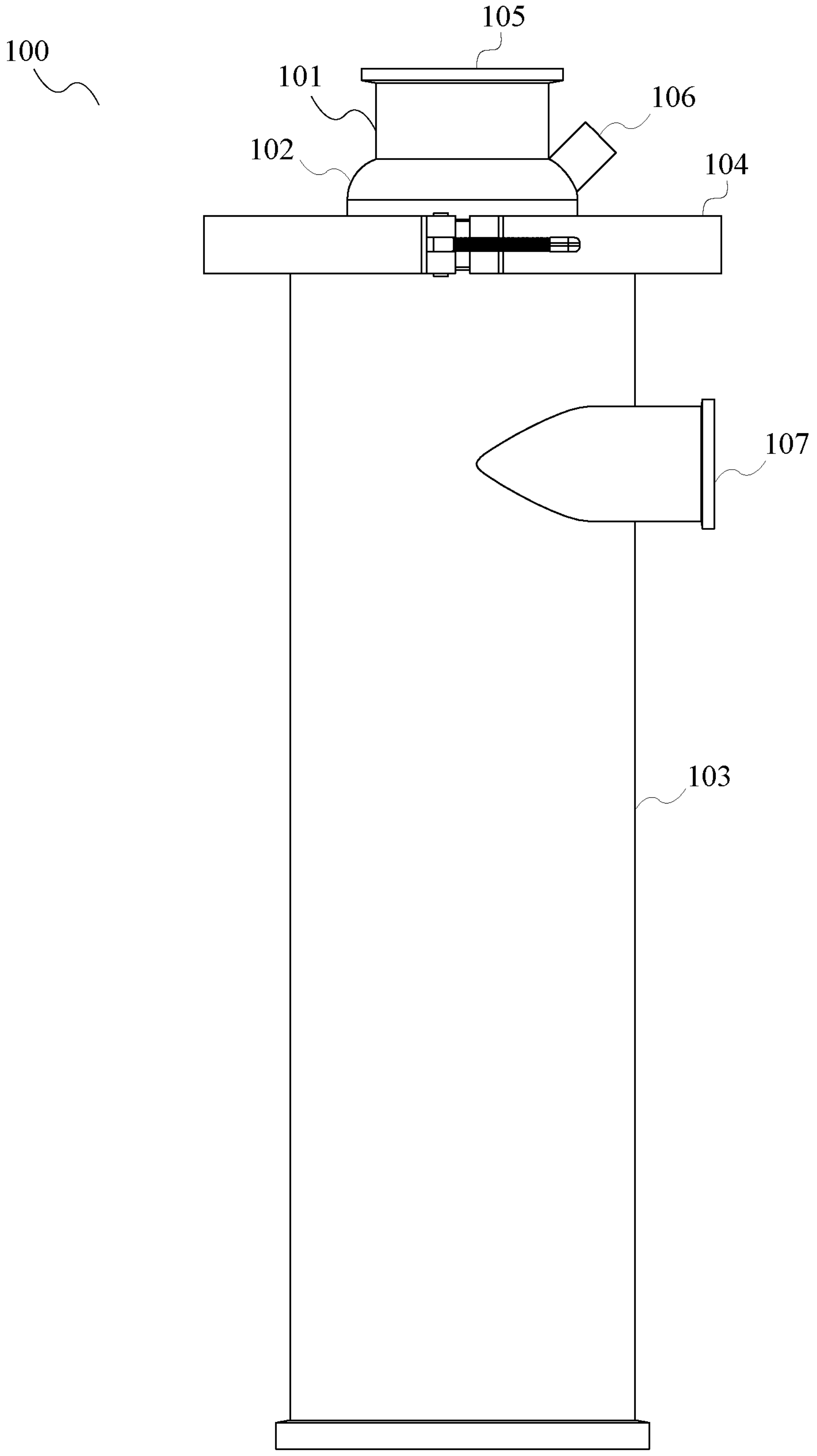
FIG. 4 is a left-side view of the present invention.
Figure 5:
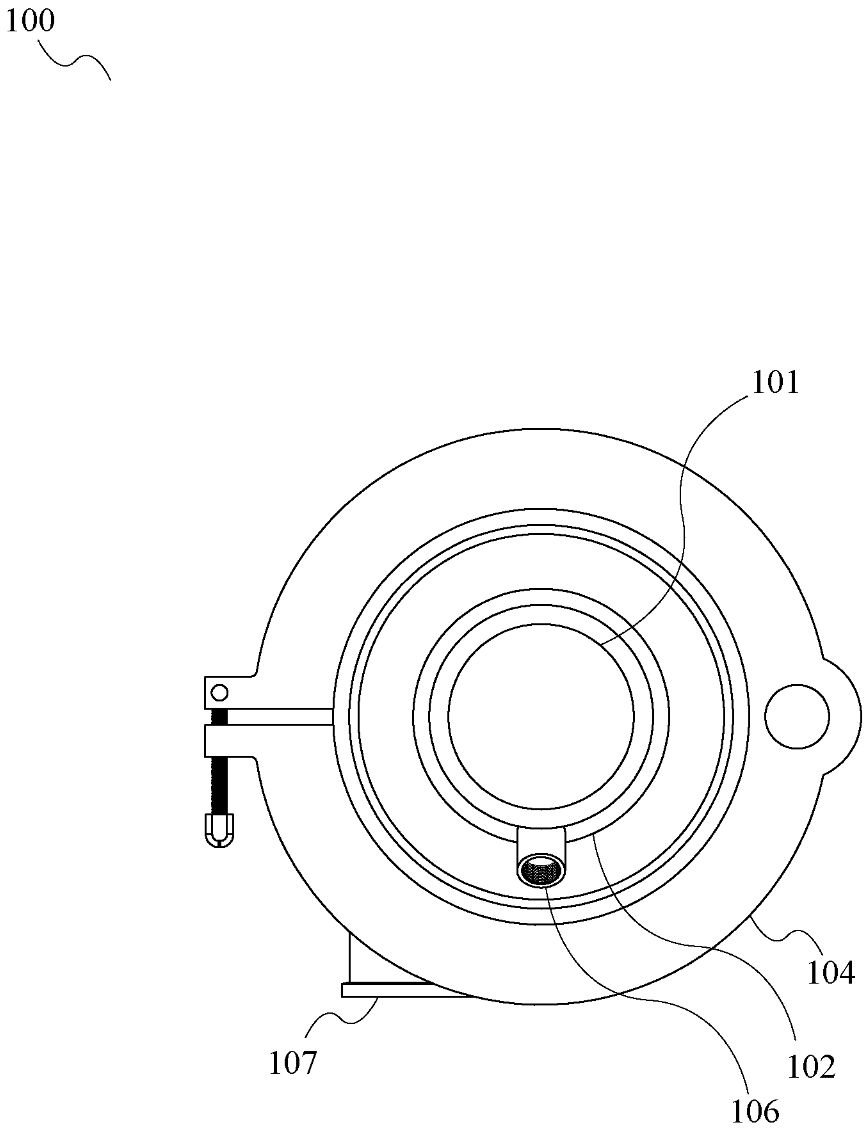
FIG. 5 is a top view of the present invention.
Figure 6:
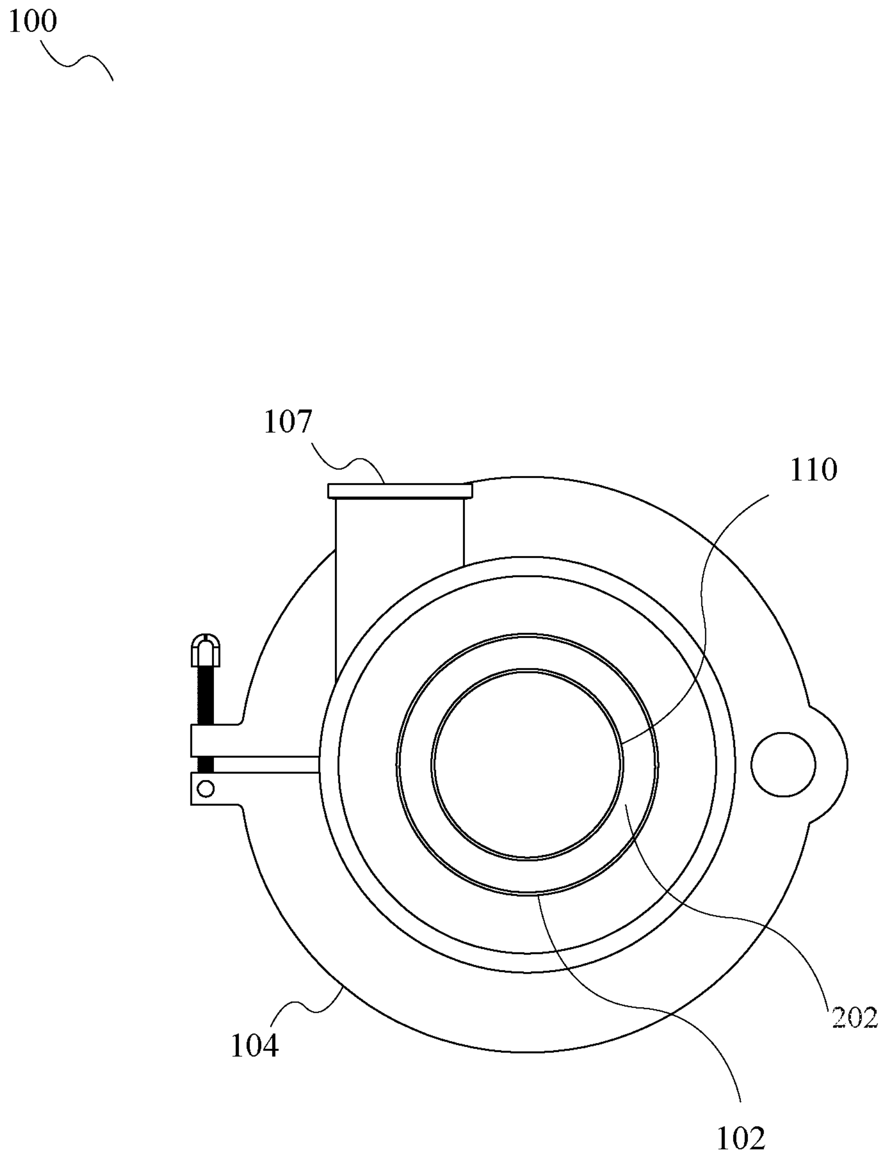
FIG. 6 is a bottom view of the present invention.
Figure 7:
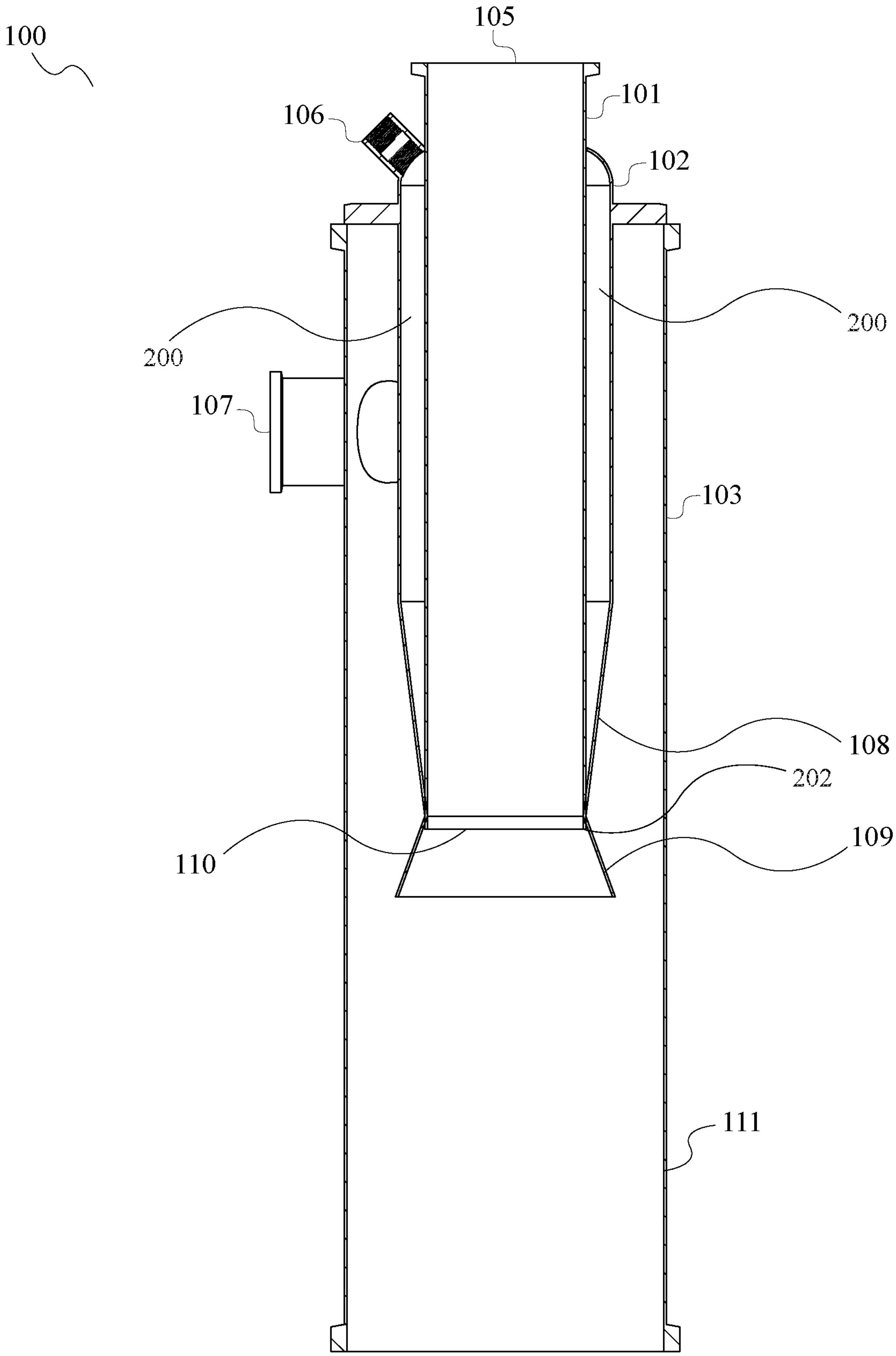
FIG. 7 is a section view of the present invention taken at line 7-7 of FIG. 2.
Figure 8:
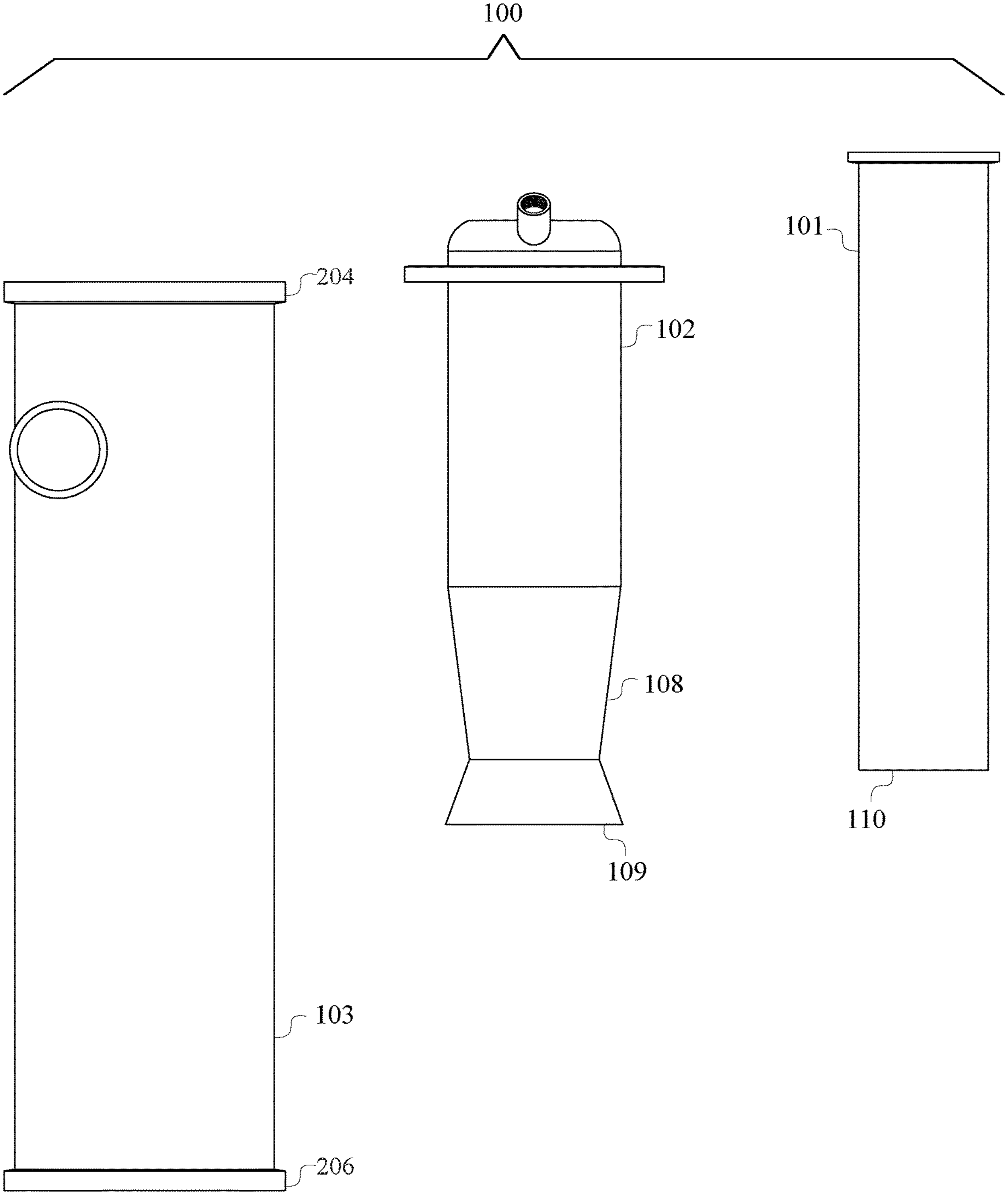
FIG. 8 is an exploded view of the present invention.

Referring to FIGS. 1-8, the present invention comprises an inline solids conditioner and pre-wetter 100. The conditioner 100 includes an inner tubular housing 101, middle tubular housing 102, outer tubular housing 103, and a clamp 104. The inner tubular housing 101 is a straight tube with a collar for connecting to the clamp 104. As shown in FIG. 8, the inner tubular housing 101 may extend vertically along a central longitudinal axis. The inlet 105 of the inner tubular housing 101 may be vertically oriented and/or aligned with the longitudinal axis of the outer tubular housing 103, such that the inner tubular housing 101, middle tubular housing 102, and outer tubular housing 103 may share a common longitudinal axis. The inner tubular housing 101 has an inlet 105 at the top and an outlet 110 at the bottom. In alternate embodiments, the inner tubular housing 101 has multiple inlets 105, allowing multiple solids to be fed simultaneously. The middle tubular housing 102 surrounds the inner tubular housing 101. The middle tubular housing 102 has a vacuum port 106. The middle tubular housing 102 has a tapered shape 108 to create a seal around the lower end of the inner tubular housing 101. The middle tubular housing 102 outlet has a flared annular nozzle 109. The outer tubular housing 103 surrounds the middle tubular housing 102 and inner tubular housing 101. The outer tubular housing 103 has a tangential liquid inlet 107. The outer tubular housing 103 may have an upstream end 204 and a downstream end 206. The tangential liquid inlet 107 may be positioned proximate to an upstream end 204 of the outer tubular housing 103. As shown in FIGS. 3-4, the tangential liquid inlet 107 may extend radially relative to the longitudinal axis of the outer tubular housing 103 and/or may be oriented substantially perpendicular to a longitudinal axis of the outer tubular housing 103 such that liquid may enter the annular space between the middle tubular housing 102 and the outer tubular housing 103. The outer tubular housing 103 includes a surge zone 111. As shown in FIG. 7, the outer tubular housing 103 may extend longitudinally beyond the flared annular nozzle 109 of the middle tubular housing 102 to define a surge zone 111 downstream of the flared annular nozzle 109. The clamp 104 seals the connection between inner tubular housing 101, middle tubular housing 102, and outer tubular housing 103. For example, in the illustrated embodiments shown in FIGS. 1-5, the clamp 104 may connect the upstream ends of the inner tubular housing 101, middle tubular housing 102, and outer tubular housing 103 to hold the housings in a fixed concentric arrangement.

The present invention is installed upstream of a device with pumping capability. Alternatively, the present invention can be installed to feed directly into a vessel. To use the invention, a first ingredient in solid or liquid form is gravity-fed into inlet 105 of inner tubular housing 101. A second ingredient in liquid form is fed into tangential liquid inlet 107 of outer tubular housing 103. As seen in FIG. 7, the tangential liquid inlet 107 may enter the outer tubular housing 103 along a transverse axis that does not intersect the central longitudinal axis of the inner tubular housing 101, for example, to generate a circumferential flow path within the outer tubular housing 103 around the inner tubular housing 101. A vacuum hose is connected to vacuum port 106. As illustrated in FIGS. 1-5 and 7, the vacuum port 106 of the middle tubular housing 102 may be positioned upstream of the tangential liquid inlet 107 of the outer tubular housing 103 relative to the flow through the inner tubular housing 101, such that the vacuum chamber may be established before the liquid enters the outer tubular housing 103. Referring to FIG. 7, an annular vacuum chamber 200 is formed between the middle tubular housing 102 and the inner tubular housing 101. The annular vacuum chamber 200 is defined by the concentric volume separating the outer surface of the inner tubular housing 101 and the inner surface of the middle tubular housing 102. The annular vacuum chamber 200 may be sealed at its downstream end by the tapered portion 108 of the middle tubular housing 102, which directly contacts the outer surface of the inner tubular housing 101. With continued reference to FIG. 7, the tangential liquid inlet 107 of the outer tubular housing 103 may be positioned axially between the upstream clamp 104 and the tapered portion 108 of the middle tubular housing 102. Partly as a result, liquid introduced through the tangential liquid inlet 107 may flow into the space defined between the middle tubular housing 102 and the outer tubular housing 103 downstream of the clamp and upstream of the tapered portion. A vacuum is formed inside the middle tubular housing 102 around the upper portion of the inner tubular housing 101. The vacuum prevents condensation from forming on the outer surface of the inner tubular housing 101. The vacuum also prevents air from being mixed with the ingredients. As the second ingredient flows over the flared annular nozzle 109 of the middle tubular housing 102, the second ingredient is spread to form a tear drop shape around the flow of the first ingredient exiting the inner tubular housing 101. Due to the tear drop shape, the first ingredient and second ingredient are mixed downstream from the flared annular nozzle 109 in the surge zone 111, preventing a build-up of the ingredients on the nozzle 109. The inner diameter of the surge zone 111 may be larger than the inner diameter of the outlet 110 of the inner tubular housing 101 and/or the maximum outer diameter of the flared annular nozzle 109. Correspondingly, the mixture may expand, and/or the device may help prevent backflow into the conditioner. The flared annular nozzle 109 of the middle tubular housing and the outlet 110 of the inner tubular housing may define an annular discharge gap 202 therebetween. The annular discharge gap 202 may be bounded by the inner surface of the flared annular nozzle 109 and the outer surface of the inner outlet 110, which may regulate the thickness of the liquid as it enters the surge zone 111. The surge (transition) zone 111 can be sized to regulate the flow of the mixture into the pump, preventing the mixture from backing up into the conditioner. The resulting mixture is a pumpable mixture of the two ingredients. The pumpable mixture is then fed into a pump.

Although the invention has been explained in relation to its preferred embodiment, it is to be understood that many other possible modifications and variations can be made without departing from the spirit and scope of the invention as hereinafter claimed.

What is claimed is:

1. An inline static mixer assembly including a tube-in-tube configuration for conditioning and pre-wetting solids for discharge into a pump or a tank comprising:

an inner tubular housing having an inlet and an outlet:

a middle tubular housing concentrically surrounding the inner tubular housing;

an annular vacuum chamber defined between an outer surface of the inner tubular housing and an inner surface of the middle tubular housing;

a vacuum port extending through the middle tubular housing in fluid communication with the annular vacuum chamber;

an outer tubular housing concentrically surrounding the middle tubular housing;

a tangential liquid inlet connected to the outer tubular housing;

wherein the middle tubular housing terminates in a flared annular nozzle concentrically surrounding the outlet of the inner tubular housing; and wherein the outer tubular housing comprises a surge zone portion extending downstream of the flared annular nozzle.

2. The inline static mixer assembly of claim 1, wherein the middle tubular housing comprises a tapered portion disposed upstream of the flared annular nozzle, the tapered portion being in contact with the inner tubular housing.

3. The inline static mixer assembly of claim 2, wherein the flared annular nozzle and the outlet of the inner tubular housing define an annular discharge gap bounded by an inner surface of the flared annular nozzle and an outer surface of the outlet of the inner tubular housing.

4. The inline static mixer assembly of claim 1, wherein the tangential liquid inlet is positioned proximate to an upstream end of the outer tubular housing.

5. The inline static mixer assembly of claim 4, wherein the tangential liquid inlet is oriented substantially perpendicular to a longitudinal axis of the outer tubular housing.

6. The inline static mixer assembly of claim 5, wherein the inlet of the inner tubular housing is vertically oriented and aligned with the longitudinal axis of the outer tubular housing.

7. The inline static mixer assembly of claim 6, further comprising a clamp connecting an upstream end of the inner tubular housing, an upstream end of the middle tubular housing, and an upstream end of the outer tubular housing.

8. The inline static mixer assembly of claim 1, wherein the surge zone portion has an inner diameter larger than an inner diameter of the outlet of the inner tubular housing.

9. The inline static mixer assembly of claim 8, wherein the inner tubular housing comprises a plurality of inlets.

10. The inline static mixer assembly of claim 1, wherein the outlet of the inner tubular housing and the flared annular nozzle are concentrically aligned along a longitudinal axis of the static inline conditioner.

11. The inline static mixer assembly of claim 10, wherein the static inline conditioner is void of internal moving mixing elements.

12. The inline static mixer assembly of claim 11, wherein the outer tubular housing extends longitudinally beyond the flared annular nozzle to define the surge zone portion.

13. The inline static mixer assembly of claim 12, wherein the vacuum port is positioned upstream of the tangential liquid inlet relative to a direction of flow through the inner tubular housing.

14. An inline static mixer assembly including a tube-in-tube configuration for conditioning and pre-wetting solids for discharge into a pump or a tank comprising:

an inner tubular housing having a vertically oriented inlet and an outlet:

a middle tubular housing concentrically surrounding the inner tubular housing;

an annular vacuum chamber defined by a space separating an outer surface of the inner tubular housing and an inner surface of the middle tubular housing;

wherein the middle tubular housing comprises a tapered portion in contact with the outer surface of the inner tubular housing, the tapered portion sealing a downstream end of the annular vacuum chamber;

an outer tubular housing concentrically surrounding the middle tubular housing;

a tangential liquid inlet connected to the outer tubular housing and positioned upstream of the tapered portion of the middle tubular housing;

wherein the middle tubular housing terminates in a flared annular nozzle extending downstream from the tapered portion;

wherein the flared annular nozzle and the outlet of the inner tubular housing define an annular discharge gap bounded by an inner surface of the flared annular nozzle and an outer surface of the outlet of the inner tubular housing; and wherein the outer tubular housing comprises a surge zone portion extending downstream of the flared annular nozzle.

15. The inline static mixer assembly of claim 14, wherein the tangential liquid inlet is oriented substantially perpendicular to a longitudinal axis of the outer tubular housing to direct liquid into a space defined by the middle tubular housing and the outer tubular housing.

16. The inline static mixer assembly of claim 15, further comprising a clamp securing an upstream end of the inner tubular housing, an upstream end of the middle tubular housing, and an upstream end of the outer tubular housing in a fixed concentric arrangement.

17. The inline static mixer assembly of claim 16, wherein the surge zone portion of the outer tubular housing has an inner diameter that is larger than an outer diameter of the flared annular nozzle.

18. An inline static mixer assembly including a tube-in-tube configuration for conditioning and pre-wetting solids for discharge into a pump or a tank comprising:

an inner tubular housing extending along a central longitudinal axis;

a middle tubular housing concentrically disposed around the inner tubular housing;

an outer tubular housing concentrically disposed around the middle tubular housing;

a clamp mechanism securing an upstream end of the inner tubular housing, an upstream end of the middle tubular housing, and an upstream end of the outer tubular housing in a fixed concentric arrangement;

a static annular vacuum chamber defined by a volume separating an outer surface of the inner tubular housing and an inner surface of the middle tubular housing;

wherein the middle tubular housing comprises a tapered portion downstream of the clamp mechanism that directly contacts the outer surface of the inner tubular housing to seal a lower end of the static annular vacuum chamber;

a tangential liquid inlet connected to the outer tubular housing at a position axially located between the clamp mechanism and the tapered portion;

wherein the middle tubular housing terminates in a flared annular nozzle extending downstream from the tapered portion; and wherein the flared annular nozzle and an outlet of the inner tubular housing define an annular discharge gap bounded by an inner surface of the flared annular nozzle and an outer surface of the outlet of the inner tubular housing.

19. The inline static mixer assembly of claim 18, wherein the tangential liquid inlet is oriented along a transverse axis that does not intersect the central longitudinal axis of the inner tubular housing, thereby defining a circumferential flow path within the outer tubular housing.

20. The inline static mixer assembly of claim 19, wherein the outer tubular housing comprises a surge zone section extending downstream of the flared annular nozzle, the surge zone section having an inner diameter that is greater than a maximum outer diameter of the flared annular nozzle.

* * * * *